(12) United States Patent
Wilbanks (10) Patent No.: US 7,281,350 B2
(45) Date of Patent: Oct. 16, 2007

(54) MOSQUITO/INSECT LARVA TRAP MAGNET SYSTEM

(76) Inventor: Alvin D. Wilbanks, 12288 Dereks Way, Holt Summit, MO (US) 65043

( * ) Notice: Subject to any disclaimer, the term of this patent is extended or adjusted under 35 U.S.C. 154(b) by 65 days.

(21) Appl. No.: 11/074,504

(22) Filed: Mar. 8, 2005

(65) Prior Publication Data

US 2006/0201052 A1   Sep. 14, 2006

(51) Int. Cl.
*A01M 1/04* (2006.01)
*A01M 1/10* (2006.01)
(52) U.S. Cl. .......................................... 43/113; 43/107
(58) Field of Classification Search ................ 43/113, 43/107, 122, 121, 17.5
See application file for complete search history.

(56) References Cited

U.S. PATENT DOCUMENTS

| | | | | |
|---|---|---|---|---|
| 970,784 A * | 9/1910 | Bohm | ........................ | 43/107 |
| 1,497,800 A * | 6/1924 | Smith | ........................ | 43/122 |
| 1,723,919 A * | 8/1929 | Bykowy | ........................ | 43/107 |
| 1,734,818 A * | 11/1929 | March | ........................ | 43/107 |
| 1,786,704 A * | 12/1930 | Deibele | ........................ | 43/122 |
| 3,513,585 A * | 5/1970 | Ross | ........................ | 43/113 |
| 3,939,802 A * | 2/1976 | Neff | ........................ | 43/113 |
| 3,951,104 A * | 4/1976 | Neff | ........................ | 119/216 |
| 3,987,577 A * | 10/1976 | Hardee | ........................ | 43/121 |
| 3,997,999 A * | 12/1976 | Evans | ........................ | 43/107 |
| 4,002,146 A * | 1/1977 | Neff | ........................ | 119/51.04 |
| 4,019,459 A * | 4/1977 | Neff | ........................ | 119/223 |
| 4,217,723 A * | 8/1980 | Hrebec | ........................ | 43/122 |
| 4,218,843 A * | 8/1980 | Clarke, Jr. | ........................ | 43/131 |
| 4,328,636 A * | 5/1982 | Johnson | ........................ | 43/107 |
| 4,638,592 A * | 1/1987 | Schneidmiller | ........................ | 43/122 |
| 5,172,514 A * | 12/1992 | Weber et al. | ........................ | 43/132.1 |
| 5,231,791 A * | 8/1993 | Falkson | ........................ | 43/122 |
| 5,301,456 A * | 4/1994 | Jobin et al. | ........................ | 43/113 |
| 5,327,675 A * | 7/1994 | Butler et al. | ........................ | 43/113 |
| 5,417,009 A * | 5/1995 | Butler et al. | ........................ | 43/113 |
| 5,815,980 A * | 10/1998 | Clarke, Jr. | ........................ | 43/113 |
| 5,819,465 A * | 10/1998 | Bryant | ........................ | 43/17.5 |
| 5,896,697 A * | 4/1999 | Kang | ........................ | 43/107 |
| 5,987,809 A * | 11/1999 | Cheok | ........................ | 43/107 |
| 6,112,453 A * | 9/2000 | Clarke, Jr. | ........................ | 43/113 |
| 6,145,242 A * | 11/2000 | Simpson | ........................ | 43/131 |
| 6,199,315 B1 * | 3/2001 | Suzue et al. | ........................ | 43/113 |
| 6,199,316 B1 * | 3/2001 | Coventry | ........................ | 43/107 |

(Continued)

FOREIGN PATENT DOCUMENTS

AU          9511632 A  *  8/1995

(Continued)

*Primary Examiner*—Darren W. Ark
(74) *Attorney, Agent, or Firm*—Edward P. Dutkiewicz (57) ABSTRACT

A housing has an upper and lower portion. Each portion has a recessed interior face, an exterior face and a periphery there around. The upper portion and the lower portion are coupled together with spacers. An aperture is provided between the upper and lower portions. A light source has an upper extent and a lower extent. The upper extent of the light source has a plurality of LEDs. The LEDs are positioned radially and are contained in a shield. The light source is adapted to be positioned such that the LEDs are in line with the aperture, the light source further having a power source with a heat source and bait.

13 Claims, 8 Drawing Sheets

U.S. PATENT DOCUMENTS

| | | | | |
|---|---|---|---|---|
| 6,425,202 B1* | 7/2002 | Lin et al. | | 43/107 |
| 6,508,032 B2* | 1/2003 | Lin | | 43/107 |
| 6,532,695 B1* | 3/2003 | Alvarado | | 43/122 |
| 6,568,124 B1* | 5/2003 | Wilbanks | | 43/113 |
| 6,594,946 B2* | 7/2003 | Nolen et al. | | 43/107 |
| 6,618,984 B1* | 9/2003 | Li | | 43/107 |
| 6,708,443 B2* | 3/2004 | Hall | | 43/107 |
| 6,817,139 B1* | 11/2004 | Powell et al. | | 43/113 |
| 6,823,622 B2* | 11/2004 | Lin et al. | | 43/122 |
| 6,854,208 B1* | 2/2005 | Chuang et al. | | 43/113 |
| 6,874,274 B2* | 4/2005 | Townsend | | 43/107 |
| 6,886,293 B2* | 5/2005 | Forehand | | 43/122 |
| 6,990,768 B1* | 1/2006 | Boston | | 43/107 |
| 7,024,815 B1* | 4/2006 | Visagie | | 43/113 |
| 7,073,287 B2* | 7/2006 | Lau | | 43/113 |
| 7,134,238 B2* | 11/2006 | Forehand | | 43/122 |
| 2002/0178641 A1* | 12/2002 | Kent | | 43/17.5 |
| 2005/0055870 A1* | 3/2005 | Yelverton | | 43/113 |
| 2005/0102888 A1* | 5/2005 | Curnow et al. | | 43/113 |
| 2005/0172542 A1* | 8/2005 | Rose | | 43/113 |
| 2005/0210735 A1* | 9/2005 | Harmer et al. | | 43/107 |
| 2005/0274061 A1* | 12/2005 | Zhu | | 43/107 |
| 2005/0279016 A1* | 12/2005 | Williams et al. | | 43/122 |
| 2006/0042154 A1* | 3/2006 | Rich et al. | | 43/107 |
| 2006/0086037 A1* | 4/2006 | Roberts | | 43/107 |
| 2006/0090391 A1* | 5/2006 | Huang | | 43/107 |
| 2006/0248782 A1* | 11/2006 | Dancy | | 43/107 |
| 2007/0056208 A1* | 3/2007 | Chen et al. | | 43/113 |
| 2007/0074447 A1* | 4/2007 | Kalogroulis | | 43/107 |

FOREIGN PATENT DOCUMENTS

| | | | | |
|---|---|---|---|---|
| BR | 200104251 A | * | 8/2003 | |
| BR | 200106282 A | * | 9/2003 | |
| BR | 200210313 A | * | 8/2004 | |
| CA | 2415153 A1 | * | 7/2004 | |
| EP | 1477061 A1 | * | 11/2004 | |
| GB | 2410668 A | * | 8/2005 | |
| GB | 2418589 A | * | 4/2006 | |
| JP | 5-103571 A | * | 4/1993 | |
| JP | 8-154553 A | * | 6/1996 | |
| JP | 10-146145 A | * | 6/1998 | |
| JP | 2001-169709 A | * | 6/2001 | |
| JP | 2003-61541 A | * | 3/2003 | |
| JP | 2003-70402 A | * | 3/2003 | |
| JP | 2003-144031 A | * | 5/2003 | |
| JP | 2005-87199 A | * | 4/2005 | |
| JP | 2006-223276 A | * | 8/2006 | |
| WO | WO-03/007710 A1 | * | 1/2003 | |

* cited by examiner

MOSQUITO/INSECT LARVA TRAP MAGNET SYSTEM

BACKGROUND OF THE INVENTION

1. Field of the Invention

The present invention relates to a mosquito/insect larva trapping and killing system and more particularly pertains to capturing and terminating of pestilence.

2. Description of the Prior Art

The use of insect killing systems of known designs and configurations is known in the prior art. More specifically, insect killing systems of known designs and configurations previously devised and utilized for the purpose of killing mosquito larvae through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 1,786,704 to Deibele discloses an insect trap. U.S. Pat. No. 4,217,723 to Hrebec discloses a fly catcher. U.S. Pat. No. 4,638,592 to Schneidmiller discloses a fly trap and attractant therefore. U.S. Pat. No. 5,172,514 to Weber discloses an insect trap. U.S. Pat. No. 5,231,791 to Falkson discloses an insect trap. Lastly, U.S. Pat. No. 5,987,809 to Cheok discloses a device for trapping insects.

While these devices fulfill their respective, particular objectives and requirements, the aforementioned patents do not describe mosquito/insect larva trapping and killing system that allows capturing and terminating of pestilence.

In this respect, the mosquito/insect larva trapping and killing system according to the present invention substantially departs from the conventional concepts and designs of the prior art, and in doing so provides an apparatus primarily developed for the purpose of capturing and terminating of pestilence.

Therefore, it can be appreciated that there exists a continuing need for a new and improved mosquito/insect larva trapping and killing system which can be used for capturing and terminating of pestilence. In this regard, the present invention substantially fulfills this need.

SUMMARY OF THE INVENTION

In view of the foregoing disadvantages inherent in the known types of insect killing systems of known designs and configurations now present in the prior art, the present invention provides an improved mosquito/insect larva trapping and killing system. As such, the general purpose of the present invention, which will be described subsequently in greater detail, is to provide a new and improved mosquito/insect larva trapping and killing system and method which has all the advantages of the prior art and none of the disadvantages.

First provided is a housing. The housing has an upper portion. The upper portion is in a generally conical configuration. The upper portion has a recessed interior face and an exterior face pointed upward. A translucent beveled periphery is provided around the upper portion. The housing has a lower portion. The lower portion has a generally conical configuration. The lower portion has a recessed interior face and an exterior face pointing downward. A translucent beveled periphery is provided around the lower portion. The upper portion and the lower portion are coupled together with a plurality of spacers. In the periphery of the upper portion aligns with the periphery of the lower portion. In this manner an interior space is formed. An aperture is provided through the interior space. The lower portion has a cylindrical aperture through a central extent.

A light source is provided. The light source is in a generally cylindrical configuration. The light source has an upper extent and a lower extent. The upper extent of the light source comprising of a plurality of green LEDs. A central circumference is provided. The LEDs are positioned radially around a central circumference. A cylindrical water resistant transparent shield is provided. The LEDs are contained in the shield. The light source is adapted to be received in the cylindrical aperture of the lower portion of the housing. The light source is positioned such that the LEDs are in line with the aperture between the upper portion and lower portion of the housing. The light source further has a plurality of power sources. The power sources include a battery pack. The battery pack is provided in the lower extent of the light source. The power sources include a solar cell. The solar cell is coupled to the upper extent of the light source. The solar cell is positioned in the exterior face of the upper portion of the housing. The power sources further include a power switch. The power switch is provided on the exterior face of the lower portion.

Provided last is a bait holder. The bait holder has a mesh exterior. Bacteria is provided. The bait holder is adapted to contain the bacteria. The bait holder is adapted to be coupled to the interior space of the housing. In this manner mosquito/insect larvae are attracted to the LEDs and bait and a heat source and will swim into the aperture between the upper portion and lower portion of the housing when the system is submerged in a body of water. The mosquito/insect larvae become trapped in the interior space of the housing until they mature and die by drowning.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved mosquito/insect larva trapping and killing system which has all of the advantages of the prior art insect killing systems of known designs and configurations and none of the disadvantages.

It is another object of the present invention to provide a new and improved mosquito/insect larva trapping and killing system which may be easily and efficiently manufactured and marketed.

It is further object of the present invention to provide a new and improved mosquito/insect larva trapping and killing system which is of durable and reliable constructions.

An even further object of the present invention is to provide a new and improved mosquito/insect larva trapping and killing system which is susceptible of a low cost of manufacture with regard to both materials and labor, and which accordingly is then susceptible of low prices of sale to the consuming public, thereby making such mosquito/insect larva trapping and killing system economically available to the buying public.

Even still another object of the present invention is to provide a mosquito/insect larva trapping and killing system for capturing and terminating of pestilence.

Lastly, it is an object of the present invention to provide a new and improved mosquito/insect larva trapping and killing system. A housing has an upper and lower portion. Each portion has a recessed interior face, an exterior face and a periphery there around. The upper portion and the lower portion are coupled together with spacers. An aperture is provided between the upper and lower portions. A light source has an upper extent and a lower extent. The upper extent of the light source has a plurality of LEDs. The LEDs are positioned radially and are contained in a shield. The light source is adapted to be positioned such that the LEDs, and a heat source, are in line with the aperture, the light source further having a power sources.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
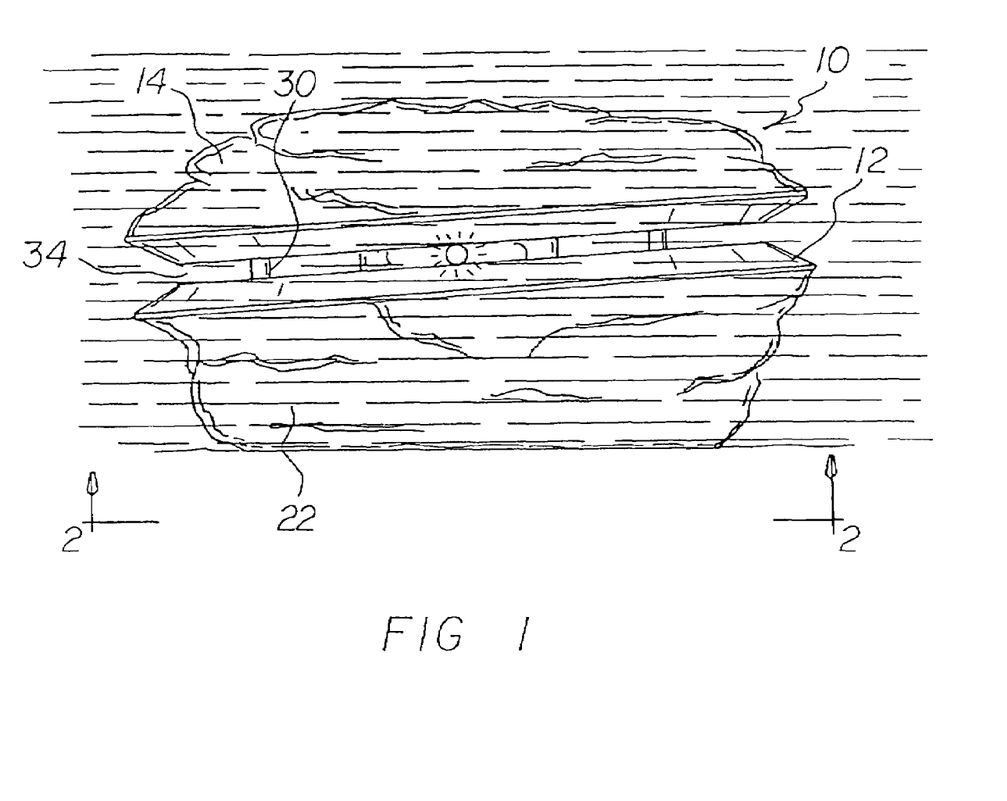
FIG. 1 is a side view of a system constructed in accordance with the principles of the present invention.

With reference now to the drawings, and in particular to FIG. 1 thereof, the preferred embodiment of the new and improved mosquito/insect larva trapping and killing system embodying the principles and concepts of the present invention and generally designated by the reference numeral 10 will be described.

The present invention, the mosquito/insect larva trapping and killing system 10 is comprised of a plurality of components. Such components in their broadest context include a housing and a light source and a heat source. Such components are individually configured and correlated with respect to each other so as to attain the desired objective.

The present invention essentially comprises a mosquito/insect larva trapping and killing system 10. First provided is a housing 12. The housing has an upper portion 14. The upper portion is in a generally conical configuration. The upper portion has a recessed interior face 16 and an exterior face 18 pointed upward. A translucent beveled periphery 20 is provided around the upper portion. The housing has a lower portion 22. The lower portion has a generally conical configuration. The lower portion has a recessed interior face 24 and an exterior face 26 pointing downward. A translucent beveled periphery 28 is provided around the lower portion. The upper portion and the lower portion are coupled together with a plurality of spacers 30. In the periphery of the upper portion aligns with the periphery of the lower portion. In this manner an interior space 32 is formed. An aperture 34 is provided through the interior space. The lower portion has a cylindrical aperture 36 through a central extent.

A light source 38 is provided. The light source is in a generally cylindrical configuration. The light source has an upper extent 40 and a lower extent 42. The upper extent of the light source comprising of a plurality of green LEDs 44. A central circumference is provided 46. The LEDs are positioned radially around a central circumference 46. A cylindrical water resistant transparent shield 48 is provided. The LEDs are contained in the shield 48. The light source is adapted to be received in the cylindrical aperture of the lower portion of the housing. The light source is positioned such that the LEDs are in line with the aperture between the upper portion and lower portion of the housing. The light source further has a plurality of power sources 50. The power sources include a battery pack 52. The battery pack is provided in the lower extent of the light source. The power sources include a solar cell 54. The solar cell is coupled to the upper extent of the light source. The solar cell is positioned in the exterior face of the upper extent of the light source. The power sources further include a power switch 56. The power switch is provided on the exterior face of the lower portion.

Provided last is a bait holder 56. The bait holder has a mesh exterior. Bacteria 58 is provided. The bait holder is adapted to contain the bacteria. The bait holder is adapted to be coupled to the interior space of the housing. In this manner mosquito/insect larvae are attracted to the LEDs and bait and will swim into the aperture between the upper portion and lower portion of the housing when the system is submerged in a body of water. The mosquito/insect larvae become trapped in the interior space of the housing until they mature and die by drowning.

Figure 2:
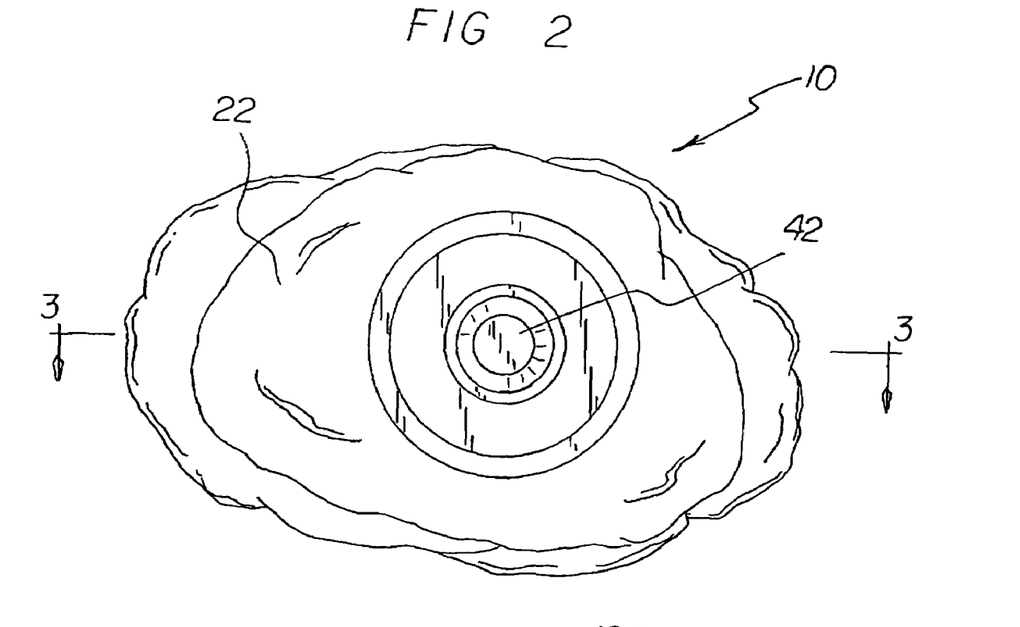
FIG. 2 is a bottom view of the system taken along line 2-2 of FIG. 1.
Figure 3:
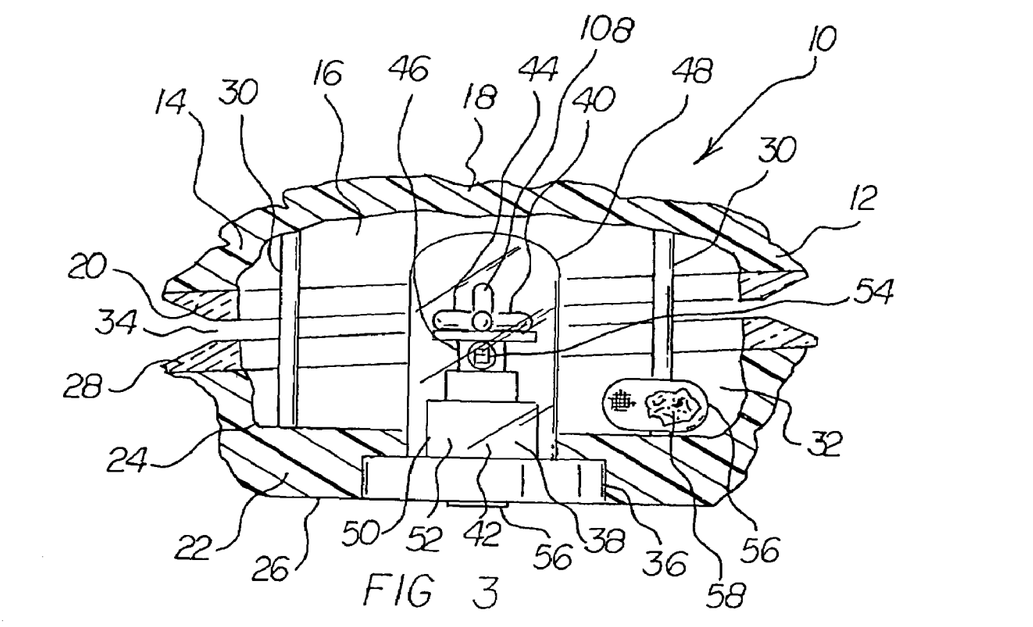
FIG. 3 is a cross sectional view taken along line 3-3 FIG. 2.

Note is taken that the primary embodiment of the invention, that illustrated in FIGS. 1, 2 and 3, the mosquito/insect larva trapping and killing system includes a housing with the exterior face of the upper portion of the housing and the exterior face of the lower portion of the housing have an appearance similar to that of a rock.

Figure 4:
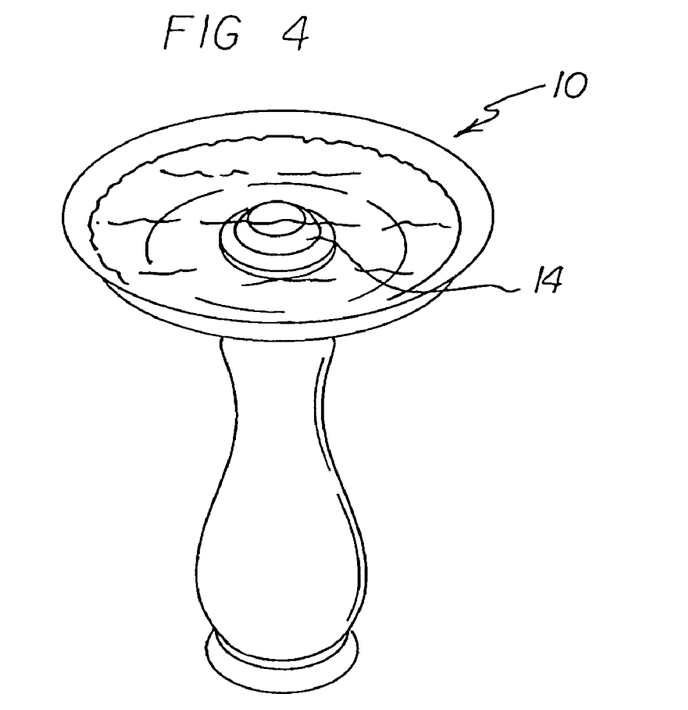
FIG. 4 is a perspective view of an alternate embodiment of the present invention.
Figure 5:
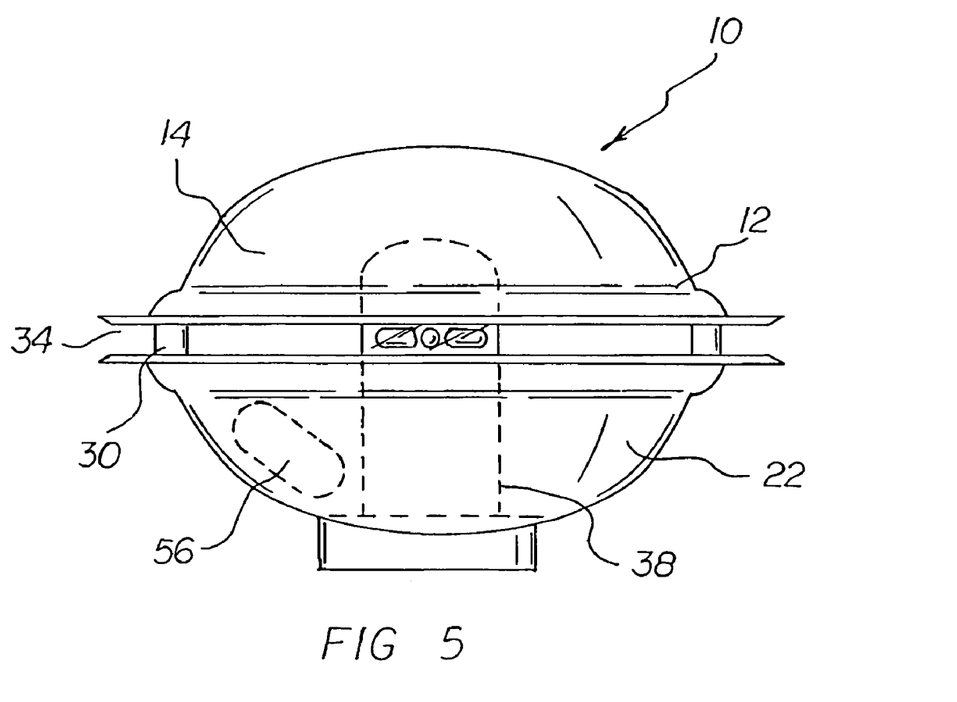
FIG. 5 is a side elevational view of the system shown in FIG. 4.

An alternate embodiment of the invention is illustrated in FIGS. 4 and 5. In such alternate embodiment, the system is illustrated as being submerged in a bird bath. The mosquito/insect larva trapping and killing system of this embodiment are essentially the same as that of the primary embodiment. Such alternate embodiment, however, includes a housing wherein the exterior face of the upper portion of the housing has the appearance similar to that of an inverted bowl and the exterior face of the lower portion of the housing has the appearance similar to that of a bowl.

In another alternate embodiment of the present invention an opaque housing 62 is provided. Note FIGS. 6, 7 and 8. The opaque housing is in a generally cylindrical configuration. The opaque housing has a first portion 64 and a second portion 66.

Figure 6:
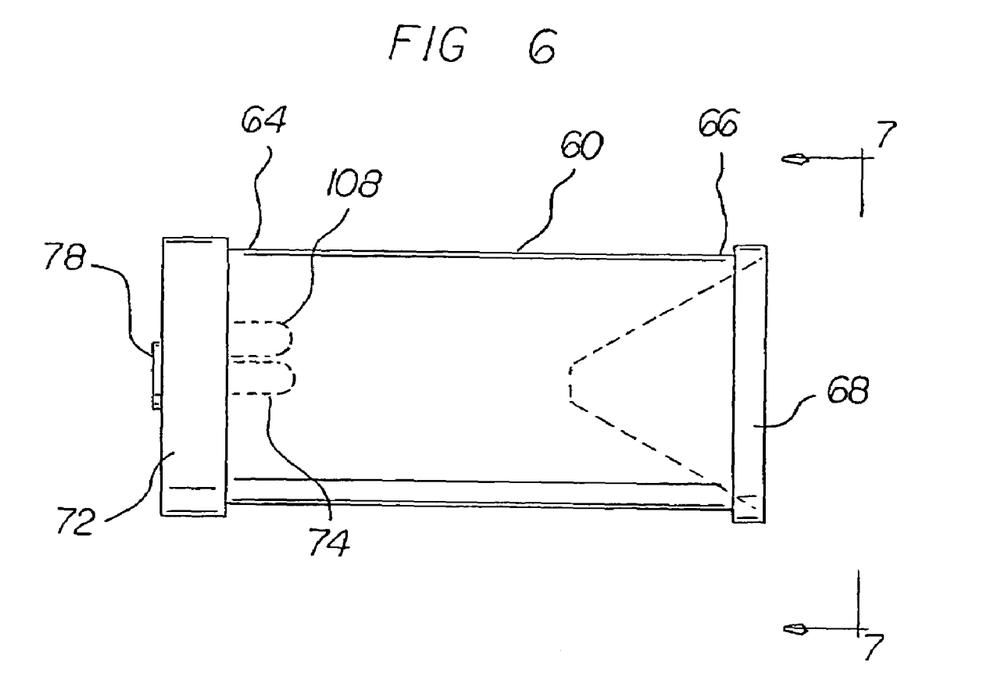
FIG. 6 is a side elevational view of another alternate embodiment of the invention.
Figure 7:
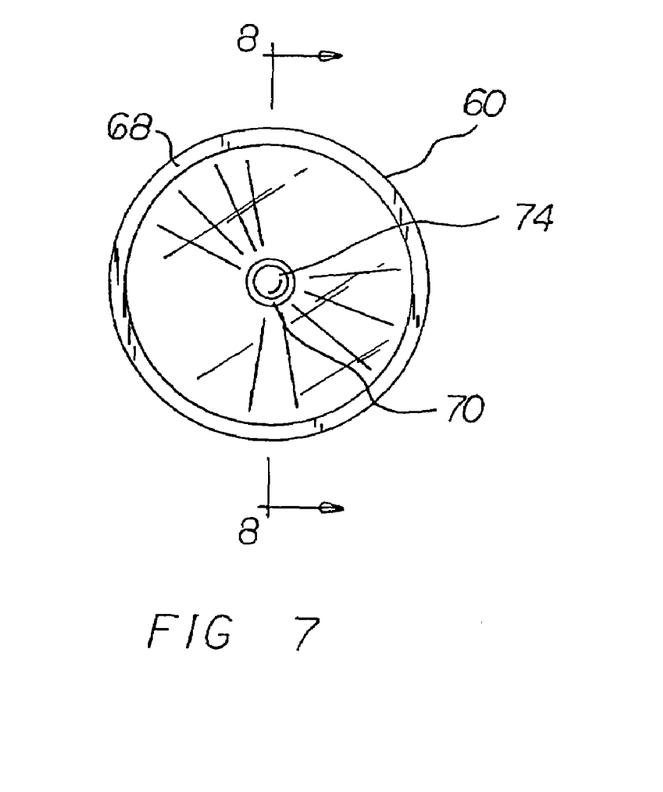
FIG. 7 is a side elevational view taken along line 7-7 FIG. 6.
Figure 8:
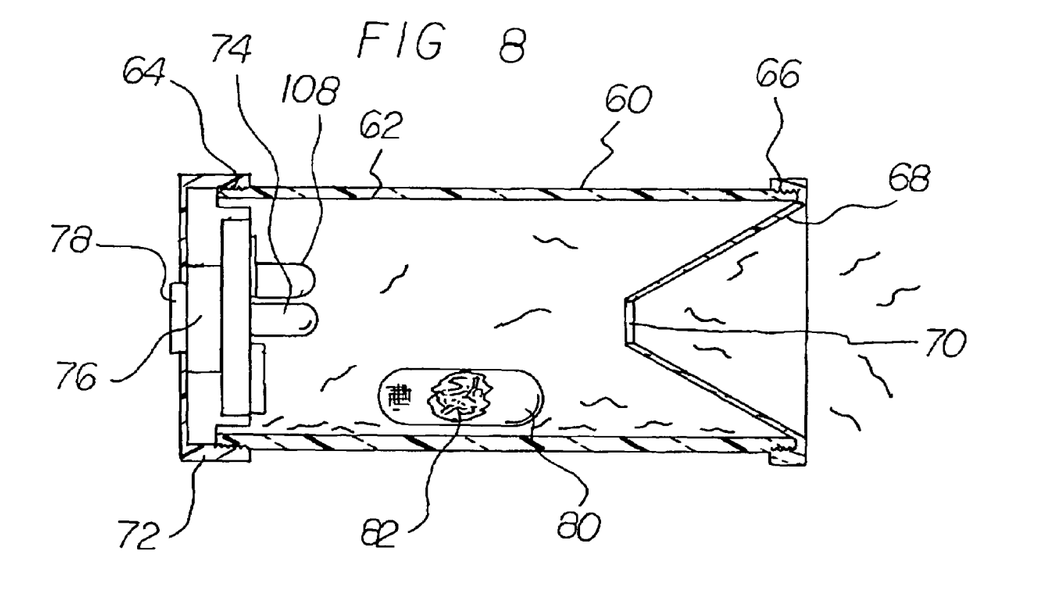
FIG. 8 is a cross sectional view taken along line 8-8 FIG. 7.
Figure 9:
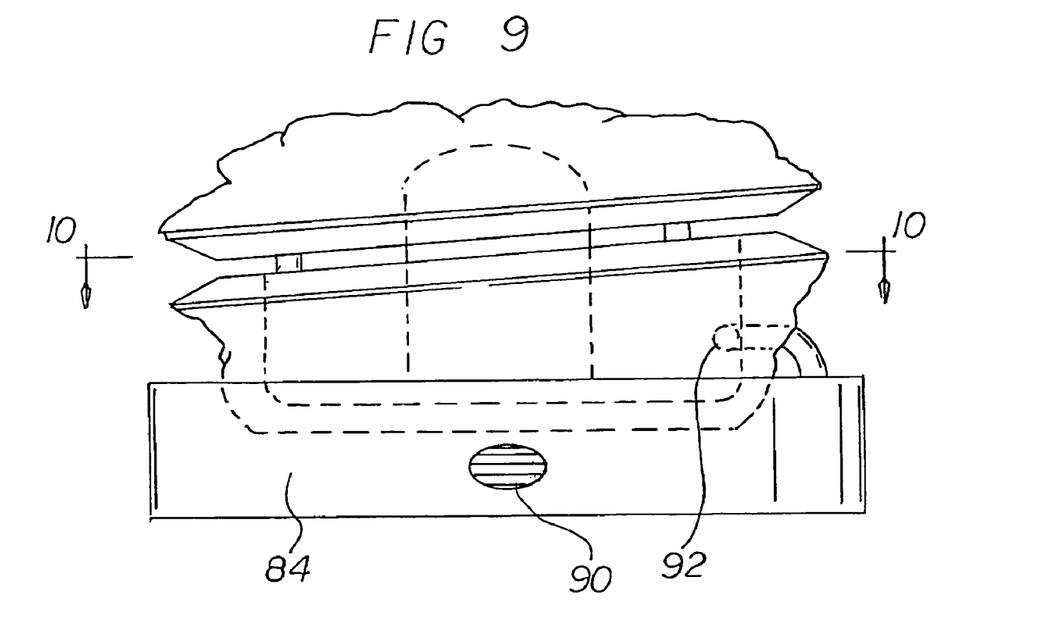
FIG. 9 is a plan view of the present invention showing the circulation pump.
Figure 10:
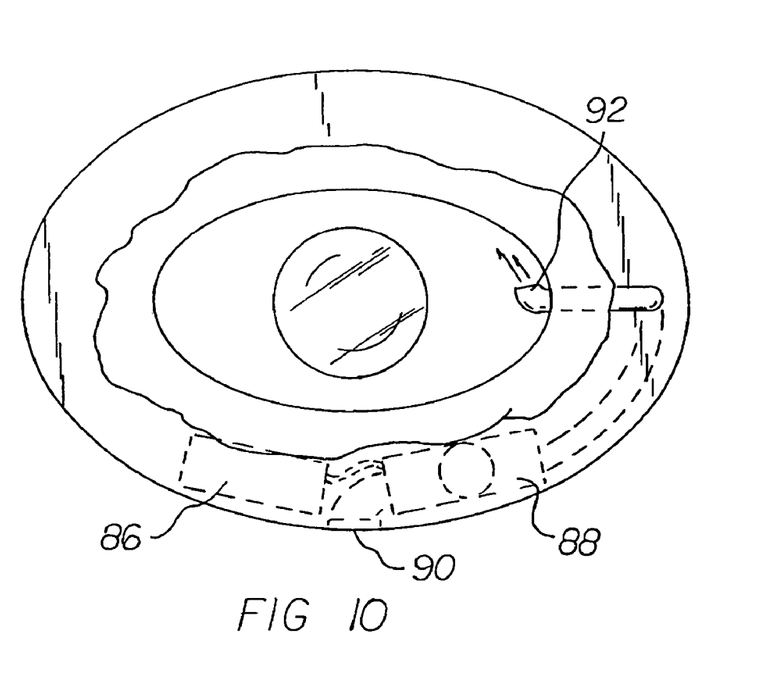
FIG. 10 is a bottom view of the present invention showing the circulation pump.
Figure 11:
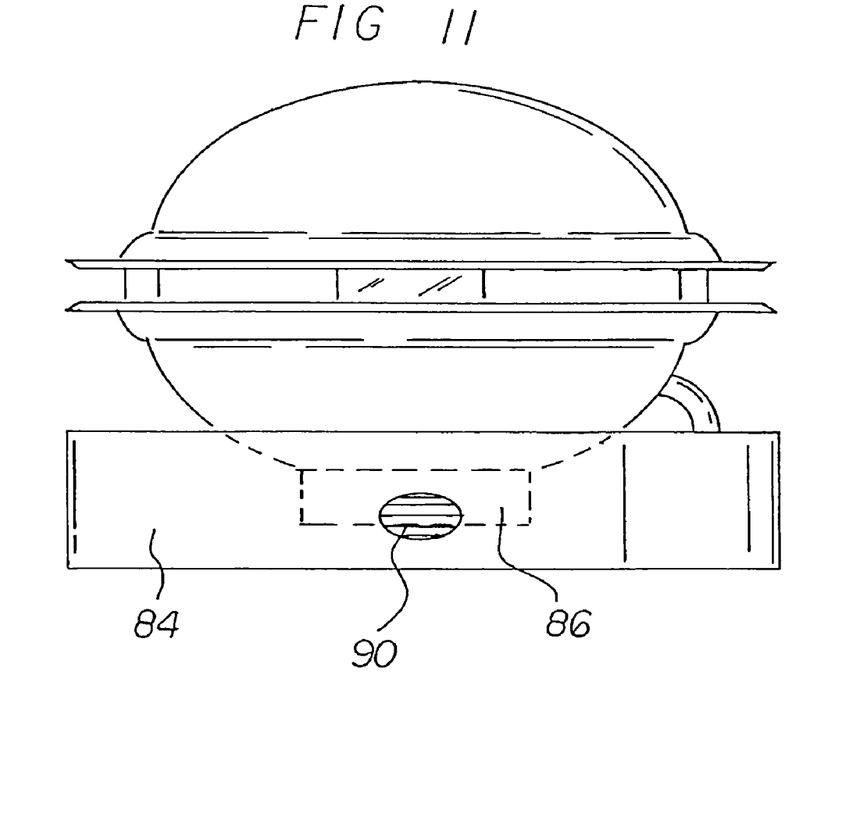
FIG. 11 is a plan view of an alternative embodiment of the present invention showing the circulation pump.
Figure 12:
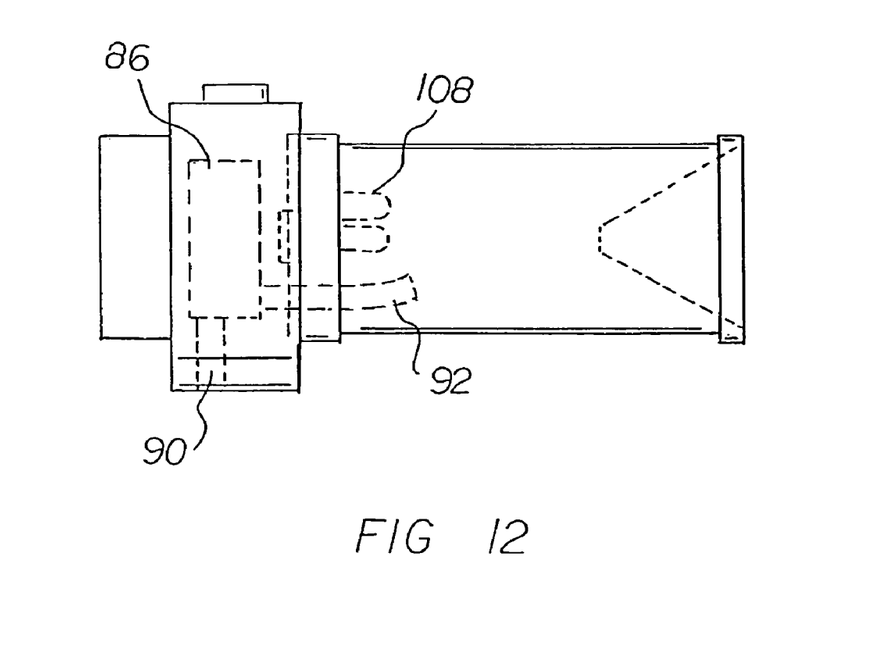
FIG. 12 is a plan view of another alternative embodiment of the present invention showing the circulation pump.

An inwardly pointing transparent conical end piece 68 is provided. An aperture 70 is provided in the end piece. The end piece is adapted to screwably couple to the second portion of the housing.

Further provided is a light source end piece 72. The light source end piece is in a generally cylindrical configuration. The light source end piece has an LED 74. The LED is positioned perpendicularly from the light source end piece. The light source further has a power sources 76 and a power switch 78. The light source end piece is adapted to screwably couple to the first portion of the house. In this manner the LEDs point toward the second portion.

Provided last is a bait holder 80. The bait holder has a mesh exterior. The bait holder is adapted to contain bacteria 82. In this manner the bait holder may be positioned in the interior space of the housing.

In addition to the various embodiments of the system as described above, the present invention also includes the bait. The bait is for use in association with a mosquito/insect larva trapping and killing system of the type having a housing with a quantity of water and a light source submerged in quantity of water. The bait is an improved bait adapted to be submerged in the water in proximity to the light source and a heat source, the bait includes bacteria and a container having a mesh exterior enclosing the bait.

The mosquito larva/insect trap of the present invention addresses the huge problem of mosquitoes and vectored diseases by reducing the mosquito population by eliminating the mosquito larvae from becoming biting adults. The installations for this would be any breeding sources or standing water.

By placing the trap into standing water, bird baths, watering troughs, rain gutters, ponds, ditches, lakes, etc, the mosquito larva/insect is attracted to the trap by the attractants, which are the LED light and bacteria bate and heat.

The main features of the trap are that it has an opaque housing with one entrance and no exit. The mosquito larvae/insect is attracted to the trap and then swims into it and drowns.

The technical problem that the mosquito larva/insect trap addresses is the diseases vectored by the mosquito. As of to date there does not exist a trap that will attract the mosquito larvae to it. Today's method of controlling the mosquito larvae is by spraying chemicals, and the use of bacteria bates.

The most important feature of this trap is that it attracts the mosquito larvae to it. After extensive research, it was found that the green LED light serves as one of the main attractants. And then by housing the green LED light and only having one entrance proved to be very successful. The main feature is to have the LED housed in an opaque housing with the entrance being a clear funnel.

The bacteria bate attractant, which is bacteria that is placed into a flow through bag. This bacteria could be preculture or natural as it grows on hay or grains.

We are attracting the mosquito larvae to the trap and we are drowning/killing without using chemicals.

The housing serves as the trapping for drowning the mosquito larvae. It also serves as the bate compartment. The opaque housing gives the mosquito larvae a direction of entrance through the clear funnel.

The clear funnel serves the purpose of letting the mosquito larvae see the attractants. The mosquito larvae are able to visualize the attractants and swim through the clear funnel where they are drowned.

The lighting has to be placed in the center of the clear funnel. The lighting is controlled by a photo censor cell that activates the light at dark and off at daylight. The photo censor cell and light are controlled by the circuit board. The can also be adapted to power by A/C power.

Figure 13:
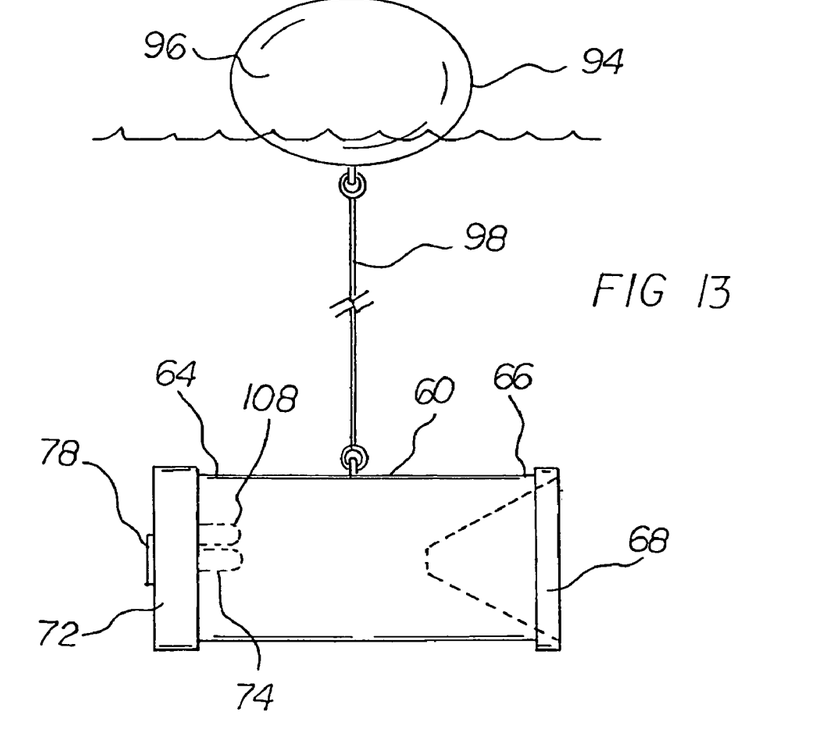
FIG. 13 is a perspective illustration of the present invention showing a suspension system using a flotation device.
Figure 14:
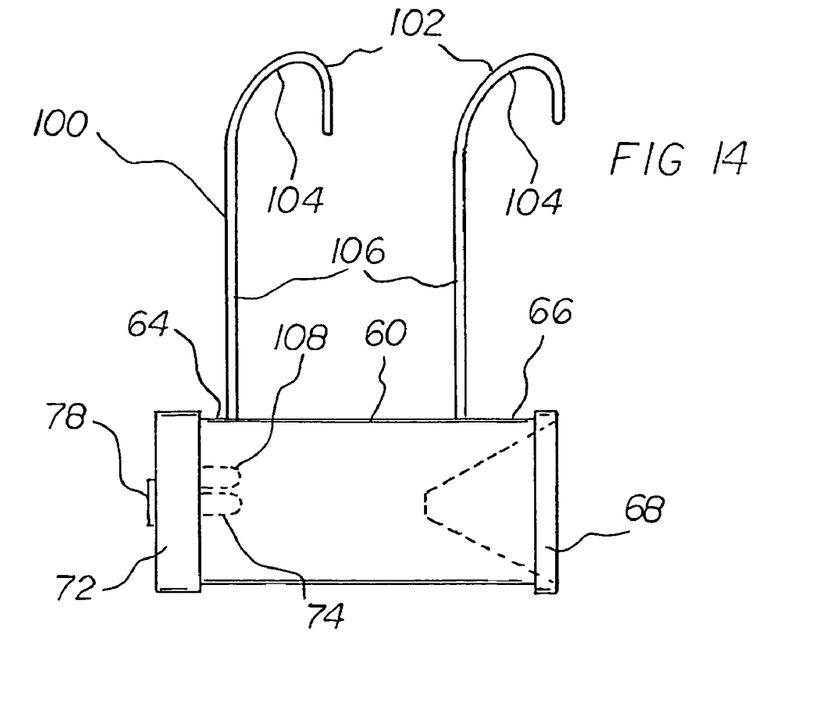
FIG. 14 is a perspective illustration of the present invention showing a suspension system using hooks.

The present system may also have a circulating subsystem 84 having a pump 86 coupled to a timer 88 clearly shown in FIG. 9-12. The circulating subsystem would also have an inlet 90 through the exterior of one of the portions of the housing and an outlet 92 through the interior of the same portion. This subsystem would allow water from the exterior environment to be pumped into the inlet and through the interior of the system via the outlet. This flow of water would flush out any debris that would collect within the system from the dead carcases. The timer being adapted to activate ideally once every 24 hours The system could further include one of two suspension system. The first suspension subsystem 94 would have a surface flotation devise 96 and a tethering component 98 shown in FIG. 13. The tethering component being adapted to couple to the upper portion of the housing and the surface flotation devise. The tethering component being adapted to adjust its length to maintain the upper portion of the housing at a desired depth from the surface. The flotation devise could take various shapes including but not limited to a lily pad, frog, boat, duck and bird. The tethering component could be a single devise or a plurality of devises. The tethering component could be made of chains, ropes, bars or the like. The desired depth ranges from 2 inches to 2 feet with the preferred depth being 6 inches from the surface of the water to the upper portion of the housing. A second suspension system 100 includes one or a plurality of securing hooks 102 shown in FIG. 14. Each hook having an upper curved end 104 adapted to attach to an outer surface of a body of water such as a bird bath, a trough or a pool. The securing hook also having an extension arm 106 being adapted to couple to the upper portion of the housing and maintain the system at a desired depth below the surface.

The system further including a heat source 108. This heat source is preferably an infrared LED which would warm the water. This warmer water attract larva.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A mosquito/insect larva trapping and killing system comprising:
    a housing having an upper portion of a generally conical configuration with a recessed interior face and an exterior face pointed upward and a translucent beveled periphery there around, a lower portion of a generally conical configuration with a recessed interior face and an exterior face pointing downward and a translucent beveled periphery there around, the upper portion and the lower portion being coupled together with a plurality of spacers such that the periphery of the upper portion aligns with the periphery of the lower portion thereby forming an interior space with an aperture there around and there between, the lower portion having a cylindrical aperture through a central extent; and
    a light source having an upper extent and a lower extent, the light source being adapted to be positioned such that the light source is in line with the aperture and located between the upper and lower housing portions, the light source further having a power source, the light source and power source being housed within a cylindrical water resistant transparent shield, the shield being located between the upper and lower housing portions.

2. The mosquito/insect larva trapping and killing system as set forth in claim 1 and further comprising a bait holder having a mesh exterior and being adapted to contain insect bait.

3. The mosquito/insect larva trapping and killing system as set forth in claim 1 wherein there is an insect bait and the insect bait is bacteria.

4. The mosquito/insect larva trapping and killing system as set forth in claim 1 wherein the light source comprises green LEDs.

5. The mosquito/insect larva trapping and killing system as set forth in claim 1 wherein the power source of the light source is a battery pack in the lower extent of the light source.

6. The mosquito/insect larva trapping and killing system as set forth in claim 1 wherein the power source of the light source is solar.

7. The mosquito/insect larva trapping and killing system as set forth in claim 1 wherein the power source of the light source is A/C power.

8. The mosquito/insect larva trapping and killing system as set forth in claim 1 wherein the exterior face of the upper portion of the housing and the exterior face of the lower portion of the housing have an appearance similar to that of a rock.

9. The mosquito/insect larva trapping and killing system as set forth in claim 1 wherein the exterior face of the upper portion of the housing has the appearance similar to that of an inverted bowl and the exterior face of the lower portion of the housing has the appearance similar to that of a bowl.

10. The mosquito/insect larva trapping and killing system as set forth in claim 1 further including a circulating subsystem having a pump coupled to a timer, an inlet through an exterior of one of the upper and lower portions of the housing, an outlet through the interior of the one of the upper and lower portions, such that water from the exterior environment is pumped from the inlet and into the system via the outlet thereby flushing debris from within the system.

11. The mosquito/insect larva trapping and killing system as set forth in claim 1 further including a heating source coupled to the power source of the light source.

12. The mosquito/insect larva trapping and killing system as set forth in claim 11 wherein the heating source is an infrared LED.

13. A mosquito/insect larva trapping and killing system for the capturing and terminating of pestilence comprising, in combination:
    a housing having an upper portion of a generally conical configuration with a recessed interior face and an exterior face pointed upward and a translucent beveled periphery there around, a lower portion of a generally conical configuration with a recessed interior face and an exterior face pointing downward and a translucent beveled periphery there around, the upper portion and the lower portion being coupled together with a plurality of spacers such that the periphery of the upper portion aligns with the periphery of the lower portion thereby forming an interior space with an aperture there around and there between, the lower portion having a cylindrical aperture through a central extent;
    a light source having a generally cylindrical configuration with an upper extent and a lower extent, the upper extent of the light source comprising a plurality of green LEDs being positioned radially around a central circumference and being contained in a cylindrical water resistant transparent shield, the light source being adapted to be received in the cylindrical aperture of the lower portion of the housing and positioned such that the LEDs are in line with the aperture between the upper portion and lower portion of the housing, the light source further having a plurality of power sources including a battery pack in the lower extent of the light source and a solar cell coupled to the upper extent of the light source, and a power switch on the exterior face of the lower portion;
    a bait holder having a mesh exterior and being adapted to contain bacteria and thereby be coupled to the interior space of the housing, such that when the system is submerged in a body of water, mosquito/insect larvae are attracted to the LEDs and bait and will swim into the aperture between the upper portion and lower portion of the housing and thereby become trapped in the interior space of the housing until they mature and die by drowning;

a circulating subsystem having a pump coupled to a timer, an inlet through the exterior of one of the upper and lower portions of the housing, an outlet through the interior of the one of the upper and lower portions, such that water from the exterior environment is pumped from the inlet and into the system via the outlet thereby flushing debris from within the system; and a heat source comprising an infrared LED coupled to the power source of the light source.

* * * * *